United States Patent [19]
Ohlson et al.

[11] Patent Number: 5,533,023
[45] Date of Patent: Jul. 2, 1996

[54] PRACTICAL MEANS FOR DYNAMIC ALLOCATION OF INDIVIDUAL DEMODULATORS TO A MULTIPLICITY OF RECEIVED RF SIGNALS

[75] Inventors: John Ohlson, Mt. View; William Slivkoff, Monte Sereno, both of Calif.

[73] Assignee: Stanford Telecommunications, Inc., Sunnyvale, Calif.

[21] Appl. No.: 358,157

[22] Filed: Dec. 16, 1994

[51] Int. Cl.[6] .................................................. H04J 1/02
[52] U.S. Cl. ........................ 370/69.1; 370/79; 455/338
[58] Field of Search ............................. 370/70, 69.1, 79; 455/3.2, 338, 340; 348/385, 387, 388

[56] References Cited

U.S. PATENT DOCUMENTS

| | | | |
|---|---|---|---|
| 5,276,904 | 1/1994 | Mutzig et al. | 455/3.2 |
| 5,289,464 | 2/1994 | Wang | 370/69.1 |
| 5,299,192 | 3/1994 | Guo et al. | 370/70 |
| 5,323,391 | 6/1994 | Harrison | 370/70 |
| 5,412,429 | 5/1995 | Glover | 348/388 |

*Primary Examiner*—Douglas W. Olms
*Assistant Examiner*—Min Jung
*Attorney, Agent, or Firm*—Jim Zegeer

[57] ABSTRACT

The hub station of a network receives a multiplicity of signals in different frequency channels and possibly on different antennas. The individual signals to be demodulated may coexist in a radio frequency channel using FDMA, TDMA, or CDMA or other signal types or combinations thereof. The received frequency band is divided into subbands which are all translated to baseband and distributed to the backplane of one or more demodulator chassis (each of which contains many demodulators). In this way, any demodulator may be connected to any signal. Relatively large segments of the input bandwidth are translated to baseband. These segments are then digitized and further band segmentation is performed digitally. In this way, the digitation and switching functions are almost all done with digital hardware. This affords considerable advantage in hardware cost, size, and reliability. The sharing of common equipment for translation to baseband affords major reductions in quantity of such translation equipment compared to conventional systems where each demodulator has its own associated translation equipment. This provides great advantages in cost, size and reliability. The demodulator outputs are decoded using bulk processing. This leads to considerable hardware savings with no reduction in demodulator allocation flexibility. The use of bulk processing allows the memory 31 associated with the decoder 30 to be located in a separate low-cost standards memory rather than in the more expensive special integrated circuit memory and this leads to further cost savings.

6 Claims, 3 Drawing Sheets

PRACTICAL MEANS FOR DYNAMIC ALLOCATION OF INDIVIDUAL DEMODULATORS TO A MULTIPLICITY OF RECEIVED RF SIGNALS

BACKGROUND AND BRIEF DESCRIPTION OF THE PRIOR ART

It is often desired to distribute a multiplicity of radio signals with similar modulation formats to a bank of demodulators for processing. For example, the hub station (HS) of a star configured satellite network may receive signals on a number of different frequency channels. Each of these channels may have a multiplicity of signals that employ frequency division multiple access (FDMA), time division multiple access (TDMA) or code division multiple access (CDMA). Further, the signals may be received on multiple antennas to provide spatial diversity. In addition, the antenna system may be duplicated so that more than one satellite can be received simultaneously.

The straight forward approach of having a demodulator configured for each possible link that may be received is often impractical due to the large number of links. Further, reliability considerations would generally dictate that each demodulator be duplicated, which is very inefficient, in order to minimize the number of demodulators required, it is desirable to be able to assign available demodulators to active channels. This is especially important when the total number of users supported is considerably less then the number of link assignments available. This may be the case, for example, if a satellite with a mufti-beam antenna is used in a nonsynchronous orbit as proposed for several of the satellite based personal communications-systems (PCS). In this instance, the beams may illuminate areas with very different user densities. Thus, at times it is necessary to assign a large number of demodulators to some beams and only a few to others. Unfortunately, the mix changes with time as the satellite moves, so dynamic allocation is required.

The problem of switching a large number of demodulators over a larger number of link assignments is not trivial, and a tradeoff must occur between the hardware saved by dynamic assignment and the hardware required to perform this operation. This tradeoff usually results in demodulators being "pooled" to be switched in groups, often with a redundant pool (of lesser size). The efficiency and flexibility of demodulator usage is primarily related to the size of the minimum number of demodulators that can be assigned to a particular channel. In general, greater flexibility and efficiency requires more complex switching: This switching generally employs analog techniques which limits the flexibility that call be obtained.

OBJECTS OF THE INVENTION

The invention disclosed below is intended to satisfy several objectives, Among these are:

1) Provide a practical means for assigning any one of a multiplicity of demodulators to any one of a larger number of received signalling links. The individual signals to be demodulated any coexist in a radio frequency channel using FDMA, TDMA, or CDMA. That is, the invention makes practical the ultimate in demodulator assignment flexibility.

2) The switching is performed almost exclusively with digital hardware.

3) Further, in-the case that forward error correction (FEC) coding is employed, a novel technique for greatly reducing the complexity of the decoder hardware is described.

SUMMARY OF THE INVENTION

The hub station of a network receives a multiplicity of signals in different frequency channels and possibly on different antennas. The individual signals to be demodulated may coexist in a radio frequency channel using FDMA, TDMA, or CDMA or other signal types or combinations thereof. The received frequency band is divided into subbands which are all translated to baseband and distributed to the backplane of one or more demodulator chassis (each of which contains many demodulators). In this way, any demodulator may be connected to any signal. Relatively large segments of the input bandwidth are translated to baseband. These segments are then digitized and further band segmentation is performed digitally. In this way, the digitization and switching functions are almost all done with digital hardware. This affords considerable advantage in hardware cost, size, and reliability. The sharing of common equipment for translation to baseband affords major reductions in quantity of such translation equipment. This provides great advantages in cost, size and reliability. The demodulator outputs are decoded using bulk processing. This leads to considerable hardware savings with no reduction in demodulator allocation flexibility. The use of bulk processing allows the memory associated with the decoder to be located in a separate low-cost standard memory rather than in the more expensive special integrated circuit memory. This leads to further cost savings.

DESCRIPTION OF THE DRAWINGS

The above and other objects, advantages and features of the invention will become more apparent when considered with the following specification and accompanying drawings wherein.

DETAILED DESCRIPTION OF THE INVENTION

Figure 1:
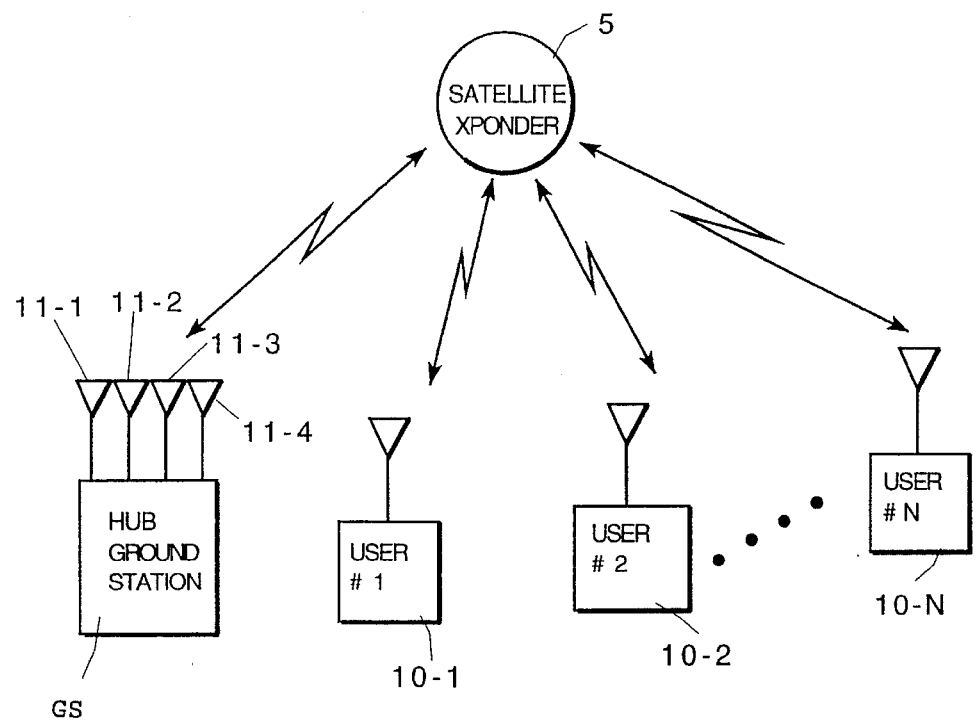
FIG. 1 is a diagram of a star configured satellite communication network incorporating the invention.

In order to describe the invention in detail, the embodiment will be discussed as it applies to the return link of a star configured spread spectrum satellite network shown in FIG. 1. The satellite S receives the user signals from the ground through a multibeam antenna (not shown) and transponds them to a hub ground station (GS). In this example, the signals are assumed to be spread spectrum CDMA in nature, and occupying approximately 2.5 MHz. It is further assumed, for illustrative purposes, that as many as 256 CDMA signals may occupy one of the 2.5 MHz subbands. The users may transmit on one of several subbands. The satellite "stacks" the various subbands from the multiplicity of beams into an appropriate bandwidth for transmission on the down link to the GS. For this discussion, it is assumed that there are 100 subbands in a 300 MHz downlink bandwidth. Further, it is assumed that the GS wishes to process signals from two satellites, and that two GS antennas are provided per satellite for spatial diversity, giving a total of four antenna outputs to be demodulated. Thus there are (100 subbands)×(256 users)×(4 antennas)=102,400 potential link assignments to be addressed.

Figure 2:
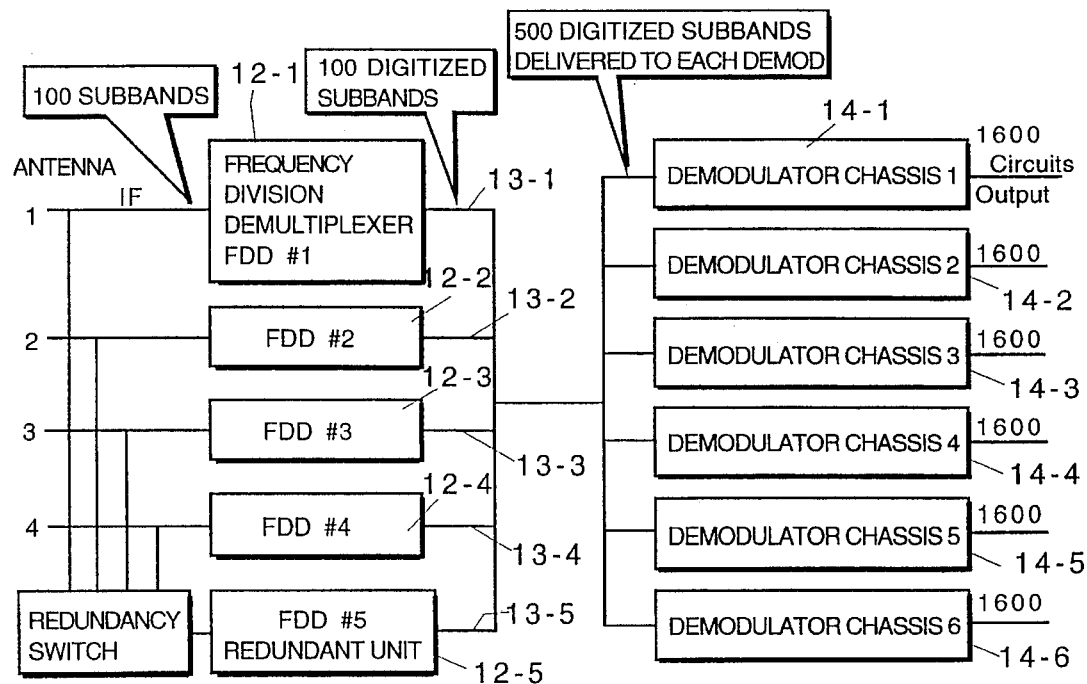
FIG. 2 is a block diagram of one embodiment or configuration of the frequency demultiplexing and demodulation hardware.

The problem to be solved is how to connect any one of a lesser number of demodulators, say 9600, to any one of the 102,400 potential links in a practical fashion. The overall structure of the signal switching and demodulator hardware is shown in Figure 2. The antenna 11-1, 11-2, 11-3, 11-4 outputs are amplified,. downconverted to an IF frequency, and routed to the Frequency Division Demultiplexer (FDD) units 12-1, 12-2, 12-3 and 12-4. A redundant FDD 12-5 is included which can be switched to any of the antennas in case of an FDD failure. Each FDD performs the functions of "destacking" the 2.5 MHz subbands (100 of them), and outputting digitized samples of each of the subbands on separate lines 13-1, 13-2, 13-3, 13-4 as discussed in more detail below. Thus there is an aggregate of 500 separate FDD output lines 13 each carrying a digitized subband. All of these lines are delivered to the backplane of each demodulator chassis 14-1, 14-2, 14-3, 14-4, 14-5, 14-6. Digital switching is utilized to connect any demodulator 14 to any of the 500 subbands. The demodulator can then demodulate any one of the 256 possible signals in that subband by selecting the appropriate PN code.

Figure 3:
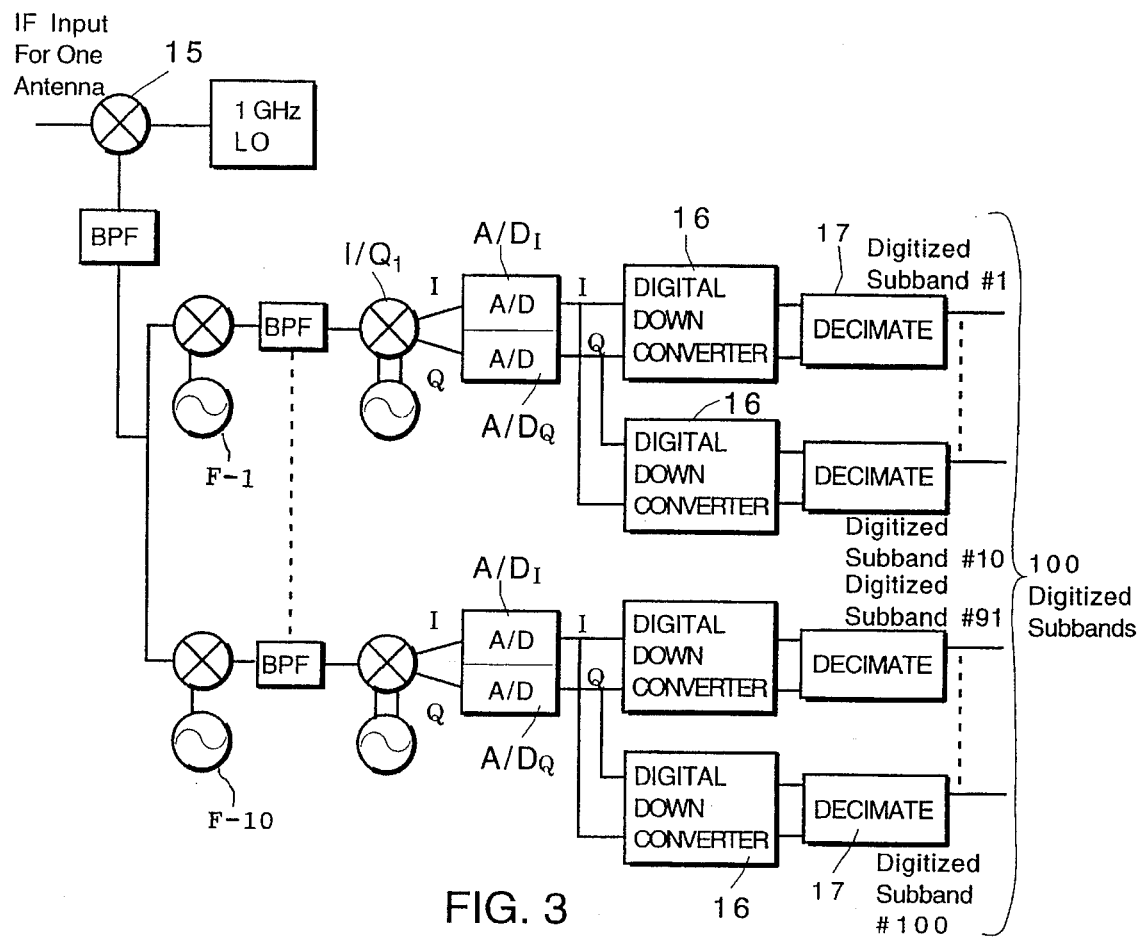
FIG. 3 is a functional block diagram of the frequency division demultiplexer (FDD)
Figure 4:
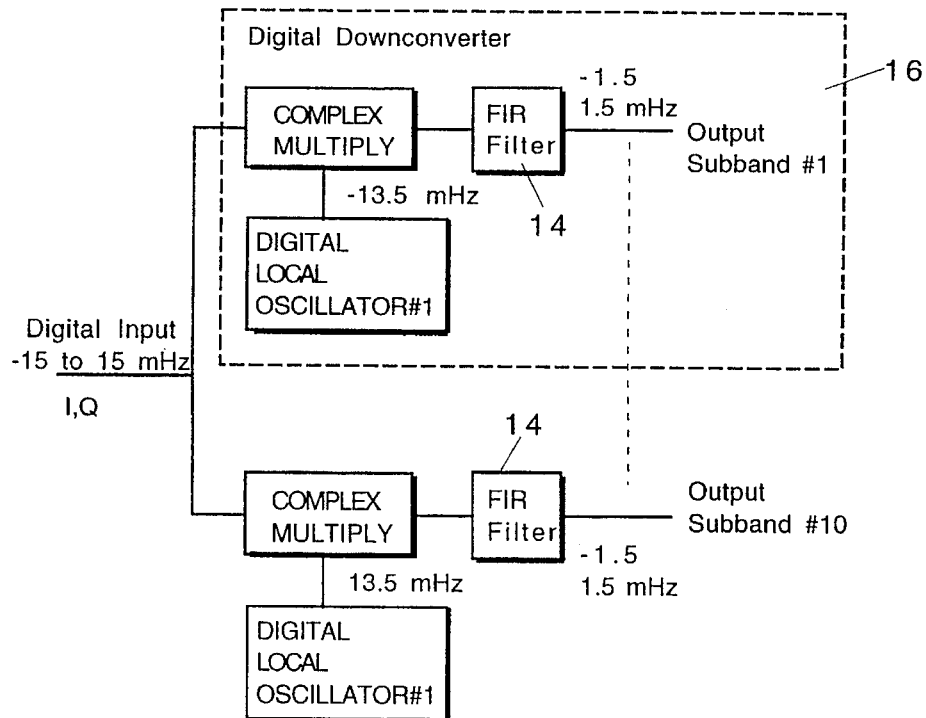
FIG. 4 is a block diagram of a digital downconverter.

A more detailed look at the FDD is presented in FIG. 3. The 300 MHz input bandwidth is first up or down converted at 15 to a suitable IF frequency. For example, suppose the input signal covers from 100 to 400 MHz. This band is up converted to 1100 to 1400 MHz. The local oscillators f1 through f10 are tuned to (710+n 30) MHz for n=1, . . . , 10 and used to downconvert the 300 MHz bandwidth to 360 MHz in increments of 30 MHz. That is, f1 translates 1100 MHz to 1400 MHz spectrum to 360 to 660 MHz. This translated spectrum is bandpass filtered (BPF) to pass 360 to 390 MHz (corresponding to 1100 to 1130 MHz). Similarly, f10 translates the spectrum to 90 to 390 MHz and it is filtered from 360 to 390 MHz corresponding to 1370 to 1400 MHz. Thus the 300 MHz input spectrum is translated into ten 30 MHz segments which occupy 360 to 390 MHz. The 30 MHz spectrums are each translated to baseband (−15 to 15 MHz) with respective inphase and quadrature mixers (I/Q) where they are sampled and digitized in respective digitizer A/DI, A/DQ at a rate sufficient to satisfy the Nyquist criterion (greater than 30 msps). The 30 MHz bandwidth can now be further subdivided into the ten 3 MHz subbands. This is done by digital downconverting in digital downconverter 16, each of the 3 MHz subbands to baseband and filtering with a finite impulse response (FIR) filter 14. The details of this process are shown in FIG. 4.

The output samples may now be decimated in decimators 17 to a rate consistent with the output bandwidth (a factor of ten lower than the input bandwidth) if desired. The lower rate simplifies distribution of the digitized signals to the demodulator chassis. We will assume, for this discussion, that the I and Q samples for each subband are multiplexed onto one line.

Signal Routing

Figure 5:
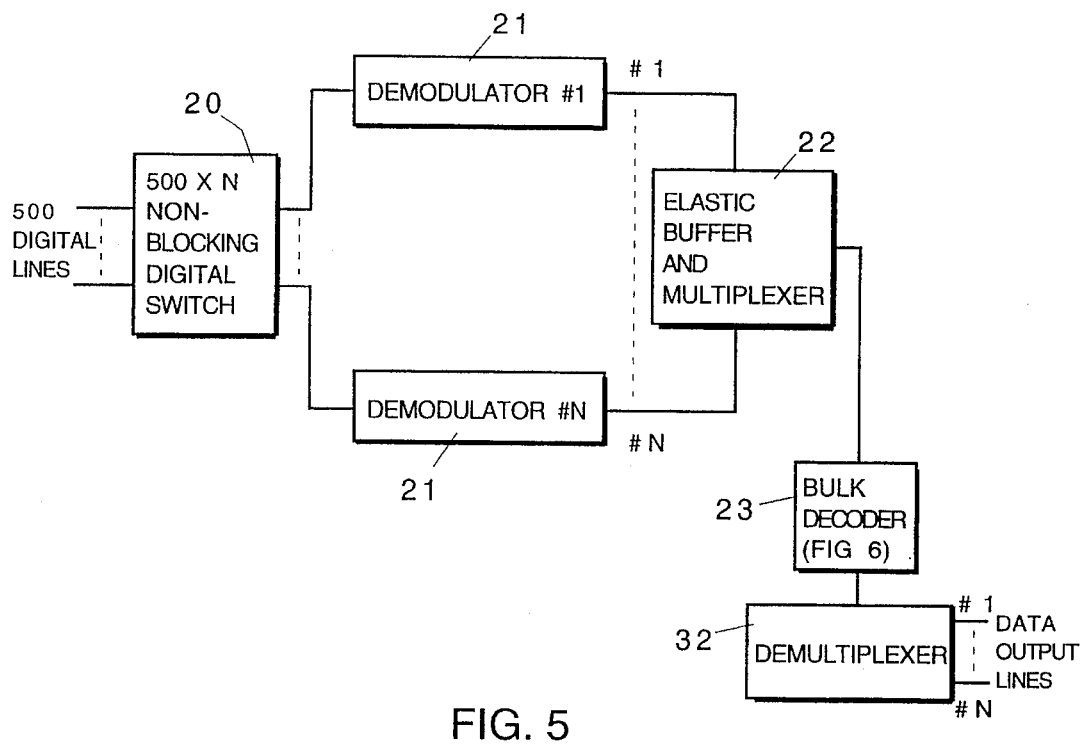
FIG. 5 is a block diagram of the demodulator printed circuitboard (PCB)

The 500 lines with digitized subbands are routed to the demodulator chassis backplanes. We will assume that there are six demodulator chassis as shown in FIG. 2. Further, each demodulator chassis 14 is assumed to contain up to ten demodulator printed circuit boards (PCB) and each PCB could contain a large number of demodulators (assume a maximum of 160 demods per PCB for this discussion). The 500 signal lines are available to each PCB through the connector to the backplane. The demodulator PCB is configured as shown in FIG. 5. The 500 signal lines are routed to a 500×N non-blocking digital switch 20 where N is the number of demodulators 21 on a PCB (N=160 in this example). Thus any demodulator 21 can be assigned to any subband from any antenna.

Figure 6:
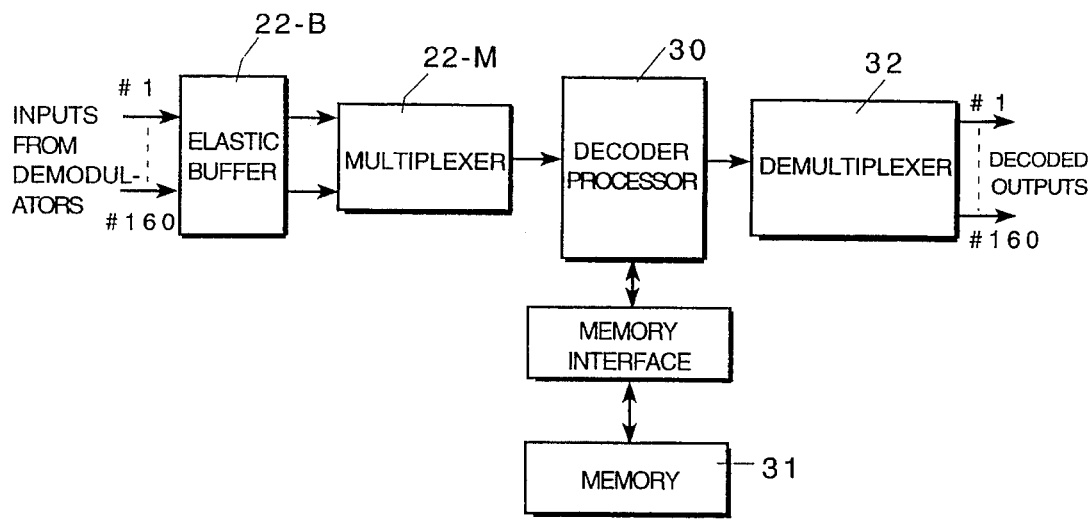
FIG. 6 is a block diagram of a "bulk" decoder.

The demodulator 21 is implemented using conventional techniques appropriate for the signal modulation and format employed. In this case, a CDMA demodulator is implemented, and an individual user signal is selected from the 256 possible users by employing the PN code assigned to that user. The N demodulator outputs are buffered 22 to accommodate slight differences in data rate due to doppler effects and user oscillator frequency errors. The outputs are then multiplexed 22 together and processed by a bulk decoder 23. The conventional approach to decoding is to associate individual decoders with each demodulator. The decoder consists of processing elements which perform the necessary decoder computations, and associated memory. The presence of multiple demodulators 21 on a single PCB, in this case 160 demodulators, lends itself to a different approach to decoding. Specifically, a single high speed decoder processor 20 or "engine" with shared memory 31 can be employed to perform the decoder calculations for all of the demodulators 21 as shown in FIG. 6. Inputs from demodulators 21 are buffered in 22B and coupled by multiplexer 22M to high speed decoder engine 30. This represents a very significant hardware savings over using individual decoders. The decoder 30 outputs are demultiplexed by demultiplexer 20 and the decoded outputs are provided to utilization devices (not shown).

Summarizing, the hub station GS of a network receives a multiplicity of signals in different frequency channels and possibly on different antennas. The individual signals to be demodulated may coexist in a radio frequency channel using FDMA, TDMA, or CDMA or other signal types or combinations thereof. Each received frequency band is divided into subbands which are all translated to baseband and distributed to the backplane of one or more demodulator chassis (each of which contains many demodulators). Thus, any selected demodulator may be connected to any selected signal. Relatively large segments of the input bandwidth are translated to baseband. These segments are then digitized and further band segmentation is performed digitally. Since the digitation and switching functions are almost all done with digital hardware, this affords considerable advantage in hardware cost, size, and reliability. The sharing of common equipment for translation to baseband affords major reductions in quantity of such translation equipment compared to conventional systems where each demodulator has its own associated translation equipment. This provides great advantage in cost, size and reliability. The demodulator outputs are decoded using bulk processing. This leads to considerable hardware savings with no reduction in demodulator allocating flexibility. The use of bulk processing allows the memory associated with the decoder to be located in a separate low-cost standard memory rather than in the more expensive special integrated circuit memory resulting in further cost savings.

While a preferred embodiment of the invention has been illustrated and described, it will be appreciated that various modifications, adaptations and variants on the invention will be obvious to those skilled in the art.

What is claimed is:

1. In a radio communication network having a hub station for receiving a large number of modulated carrier radio signals having similar data modulation formats and on a plurality of different frequency channels, and demodulator means for extracting data from said modulated carrier radio signals, the improvement comprising:

means to divide each frequency channel into a plurality of subband signals and means to translate each subband signal/to baseband signals, one or more demodulator chassis, each demodulator chassis having a plurality of demodulators, and means for selectively coupling any selected one of said baseband signals to any selected one of said plurality of demodulators, respectively.

2. The radio communication network defined in claim 1 including means to digitize each said baseband signal and provide a plurality of digitized baseband signals.

3. The radio communication network defined in claim 1 including bulk decoder processor means, multiplexer means for coupling outputs of said demodulator means to said bulk decoder processor means for supplying the decoded outputs to a utilization device.

4. The radio communication network defined in claim 2 including means to divide each plurality of digitized baseband signals to second subband signals.

5. The communication network defined in claim 2 wherein said means for selectively coupling includes a nonblocking digital switch.

6. The radio communication network defined in claim 1 wherein individual carrier radio signals to be demodulated coexist in a radio frequency channel using frequency division multiple access (FDMA), time division multiple access (TDMA), or code division multiple access (CDMA) and combinations thereof.

* * * * *